United States Patent [19]

Jerath

[11] Patent Number: 5,061,187

[45] Date of Patent: Oct. 29, 1991

[54] ULTRASOUND TRAINING APPARATUS

[76] Inventor: Ravinder Jerath, 2100 Central Ave., Augusta, Ga. 30909

[21] Appl. No.: 507,760

[22] Filed: Apr. 12, 1990

[51] Int. Cl.$^5$ .............................................. G09B 9/00
[52] U.S. Cl. .................................. 434/262; 434/273; 434/267
[58] Field of Search ............... 434/262, 267, 268, 272, 434/273, 274; 128/660.01

[56] References Cited

U.S. PATENT DOCUMENTS

| | | | |
|---|---|---|---|
| 2,127,774 | 8/1938 | Jacobs | 434/273 |
| 2,132,226 | 10/1938 | Wahlberg | 434/273 |
| 2,495,568 | 1/1950 | Coel | 434/273 |
| 2,995,832 | 8/1961 | Alderson | 434/268 |
| 3,855,714 | 12/1974 | Block | 434/269 |
| 4,277,367 | 7/1981 | Madsen et al. | 128/660.01 X |
| 4,481,001 | 11/1984 | Graham et al. | 434/267 |
| 4,493,653 | 1/1985 | Robbins et al. | 434/262 |
| 4,657,021 | 4/1987 | Perry et al. | 128/630 |
| 4,894,013 | 1/1990 | Smith et al. | 434/268 |

*Primary Examiner*—Richard J. Apley
*Assistant Examiner*—Rachel M. Healey
*Attorney, Agent, or Firm*—Thomas, Kerr & Kayden

[57] ABSTRACT

A medical ultrasound training apparatus comprises a simulated body cavity adapted to contain a number of elements simulating the ultrasonic response characteristics of internal human anatomy. Simulated body fluid fills the cavity and surrounds and suspends the elements therein and a skin simulating membrane covers the cavity. A medical trainee performs ultrasound examination on the apparatus which produces ultrasound images similar to those produced by a live patient thereby providing the trainee with valuable experience in applying and analyzing the results of the ultrasound examination.

16 Claims, 2 Drawing Sheets

ULTRASOUND TRAINING APPARATUS

TECHNICAL FIELD

This invention relates to medical training and particularly to training in the application of ultrasound techniques and interpretation and analysis of ultrasound images.

BACKGROUND OF THE INVENTION

Ultrasound imaging techniques have been employed for some time by physicians in examining the condition of the body's internal organs without physical intrusion into the body cavity. In applying such techniques, high frequency ultrasonic sound is transmitted into the body usually through an ultrasonic transducer moved about the surface of the body. Some of this sound is reflected by internal organs with the intensity and spatial characteristics of the reflected sound corresponding to the arrangement and physical condition of the reflecting organs. The transducer receives the reflected sound and converts it to corresponding electrical pulses which are transmitted to an electronic analyzer. The information embodied in the pulses is electronically interpreted by the analyzer and displayed on a video monitor as shadowy images of the internal organs for review by attending physicians.

Ultrasonography has proven particularly useful in its application to the obstetric and gynecologic patient. Although at its inception, ultrasound in such applications was limited to the most basic description and measurements of the fetus, today subtle abnormalities or maladies of almost every fetal organ system as well as of the organs of the female reproductive system are being imaged routinely and made the basis of diagnosis and treatment. As a result of increased reliance on ultrasound, the skill and experience of physicians and other medical personnel who apply ultrasonographic techniques and interpret the shadowy and often illusive sonographic images that result has become an increasingly critical factor in accurate and reliable diagnosis.

Unfortunately, clinical training of medical personnel in ultrasound techniques and analysis has heretofore been severely limited because such training has been restricted to experience gained through ultrasonographic examination of actual living patients. Naturally, one cannot choose the number and frequency of such patients or the types and degrees of their respective maladies. Consequently, training through actual experience has proven to be sporadic at best and generally limited to the most commonly encountered maladies. Years of experience have thus commonly been required to qualify a physician for accurate and reliable sonographic application and analysis and many less experienced physicians have often been forced to refer patients to more experienced ultrasound "experts" resulting in corresponding additional time, expense and hardship for these patients.

A continuing and unaddressed need exists, therefore, for a reliable and highly accelerated method and enabling apparatus for training medical personnel in the use of ultrasound equipment and in the interpretation and analysis of resulting sonographic images. It is to the provision of such a method and apparatus that the present invention is primarily directed.

SUMMARY OF THE INVENTION

The present invention in a preferred form is a clinical ultrasound training method and apparatus for use by obstetricians, gynecologists and other medical personnel to gain rapid and varied experience in applying and analyzing the results of ultrasound pelvic examinations. While the particular embodiment addressed herein relates to training in gynecological applications, it will be obvious that the embodied principles apply equally to ultrasound training in general. The apparatus comprises a life size model of the female pelvic cavity preferably fabricated of a rigid pelvic bone structure covered with an interior latex rubber diaphragm to form a simulated female pelvic cavity. Internal female pelvic organs such as the vagina, uterus, fallopian tubes, ovaries and urinary bladder are modeled with latex rubber sacs or balloons filled with water, oil or other appropriate fluid to simulate the sonic density of these organs in a living individual. Various simulated maladies such as tumors, cysts and foreign bodies can be implanted in these models or in the cavity itself. The simulated organs and implanted maladies are placed within the pelvic cavity in their normal occurring relative positions and are there suspended in a sonolucent fluid such as glycerine that simulates living body fluid. The simulated pelvic cavity, organs and maladies therein are then covered with a sheet of latex that simulates human abdominal skin.

With the model thus assembled, a trainee can perform an ultrasound examination thereon just as he would with a live patient by moving the ultrasound transducer about the outer surface of the latex cover. The internal suspension fluid and latex covering of the model closely simulate the touch and feel of the lower abdominal and pelvic area of an actual patient as the examination proceeds and the simulated internal pelvic organs and implanted maladies produce ultrasound images that closely parallel in character and appearance those produced by living organs and corresponding actual maladies. The trainee thus experiences the touch and feel of an actual ultrasound examination and can experiment with the subtle manipulations of the transducer that can result in improved ultrasound images. More importantly, the trainee can gain invaluable experience in interpreting the real time ultrasound images produced by his examination to detect and diagnose the various maladies that may have been implanted in the model.

Since the trainee examines a model and not a living patient, there is virtually no limit to the training time that can be provided. Further, the variety and character of maladies that can be simulated and examined during such time is not limited to that of commonly occurring maladies. The trainee can therefore gain valuable experience in recognizing and diagnosing maladies and conditions that occur only rarely in living patients. Thus, experience that heretofore might have required months or even years to gain through actual clinical examination can now be condensed with the present invention into just weeks. Further, the trainee can now have unlimited exposure to rare maladies that might only appear occasionally in live patients and can thus learn to recognize such maladies easily from their corresponding ultrasound images. The result is a much larger and more highly trained group of physicians that are individually capable of reliable and consistent diagnosis using the results of ultrasound examination. The general quality of medical care is thus enhanced.

It is therefore an object of the invention to provide a simulated human anatomical model for ultrasound training.

It is a further object of the invention to provide a method of training medical personnel in the use of medical ultrasound imaging equipment.

An additional object of the invention is to provide a method of training medical personnel in the analysis of ultrasound images to diagnose internal maladies.

Another object is to provide an ultrasound training method and apparatus capable of condensing what previously has been years of ultrasound experience into a few weeks of training.

These and other objects, features and advantages of the invention will become more apparent upon review of the following detailed description in conjunction with the accompanying drawings.

Table 1 lists several simulatable internal organs and maladies with corresponding preferred simulations thereof.

DETAILED DESCRIPTION

Figure 1:
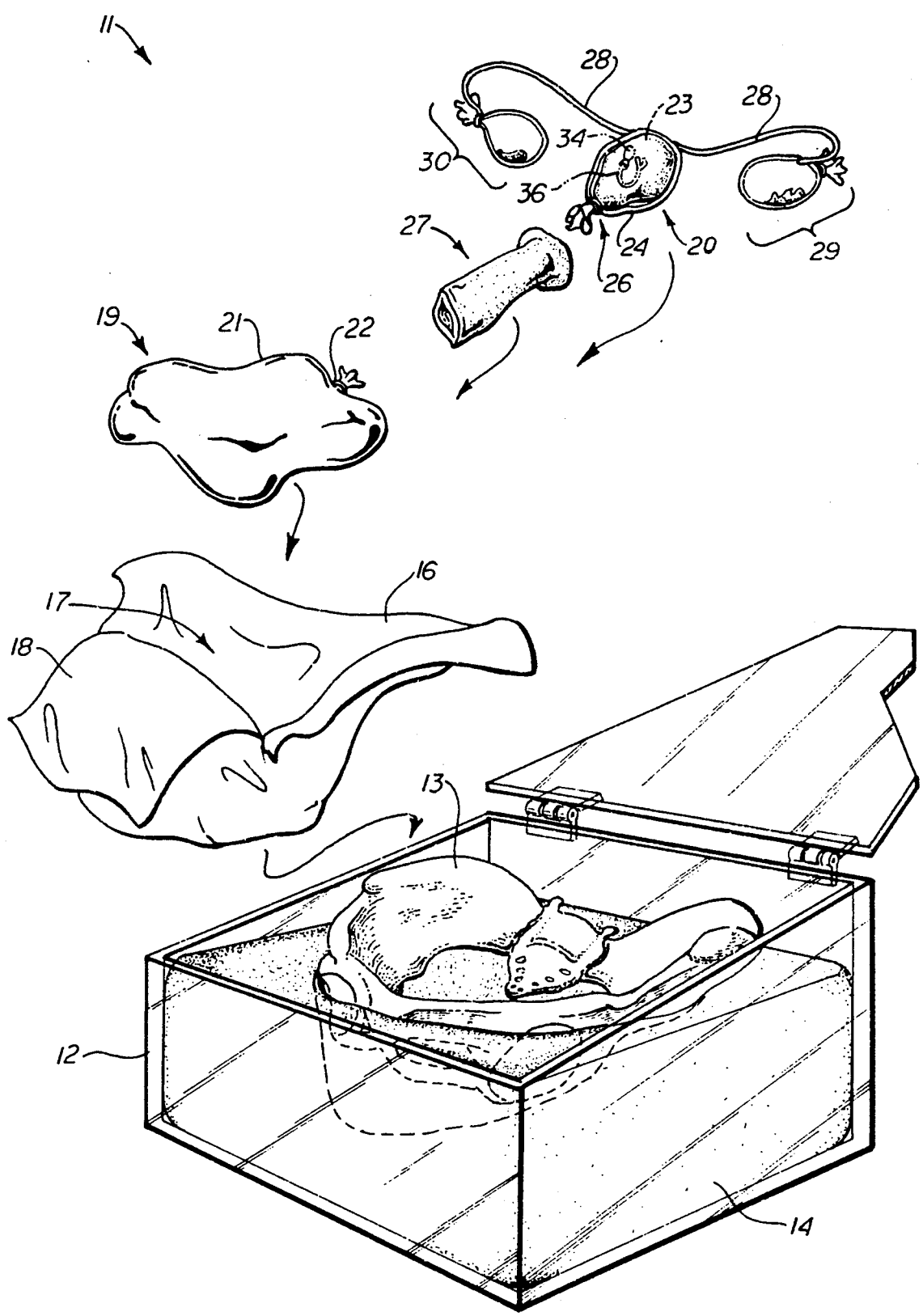
FIG. 1 is an exploded perspective view of an apparatus that embodies principles of the invention in a preferred form.

Referring now to the drawings in which like numerals represent like elements throughout the several views, FIG. 1 illustrates an ultrasound training apparatus that embodies principles of the invention in a preferred form. Specifically, the apparatus 11 comprises a container 12 that is preferably formed of a sonoluscent material such as plexiglass and that is sealed to form a liquid tight enclosure. The container 12 is sized to receive a member 13 that simulates the female pelvic bone structure. The member 13 can be excised from an actual female skeleton or can be molded from a suitable synthetic material if desired. A foam bed 14 is positioned in the container 12 and is sculpted to receive and support the member 13 in an orientation corresponding to that of a patient lying on her back. The container 12 includes a lid 10 positioned to be closed over the apparatus 11, the lid also being transparent to ultrasonic waves of the type issued by ultrasound examination equipment.

A latex rubber lining or membrane 16 is shaped to conform to the interior contours of the member 13 and is insertable therein to bound a simulated female pelvic cavity 17. The membrane can be formed of a single piece of contoured latex as shown or, alternatively, can be formed by applying latex strips to the interior surfaces of the member 13 and sealing the strips together to define the pelvic cavity. In either case, the lining is preferably impervious to liquid for purposes set out more fully hereinbelow. A latex rubber flap 18 is advantageously provided for covering the cavity 17 and its contents and for simulating the abdominal tissue of a living patient.

With the lining 16 in position covering member 13, the pelvic cavity 17 defined thereby can be filled with various members or elements for simulating the ultrasonic response of the female pelvic anatomy during ultrasound examination. In this regard, and with reference to Table 1, a simulated urinary bladder 19 is formed of a latex rubber balloon 21 at least partially filled with water or other urine simulating liquid and tied or otherwise sealed off at 22 to contain the water. Prior to being filled, the balloon has preferably been prestretched beyond its elastic limit, as for example, by being overfilled with water or air to destroy its elasticity. Such a prestretched balloon better simulates an actual urinary bladder which is generally flaccid within the pelvic cavity and tends to conform to the contours of and cradle adjacent organs. The interface between the bladder walls and cradled organs is important in ultrasonography because it provides a reflecting surface that tends to outline the organs on an ultrasound image. This characteristic of an actual urinary bladder has been found accurately modeled with the present prestretched partially filled balloon. The urinary bladder simulated as just described is then placed within the pelvic cavity in its naturally occurring position relative to other organs.

The human uterus generally includes muscular walls known as the myometrium that bounds an interior uterine cavity, the ultrasonic response of which must be modeled in the present invention. It has been found that a simulated uterus 20 that provides ultrasound images very similar to those produced by a living uterus can be modeled with a piece of animal tissue such as, for example, lean pork meat 23 that has been carved to form an internal cavity approximating that of a living uterus and to approximate the myometrium and exterior dimensions and contours of a living uterus. The carved tissue is preferably enclosed within a latex sac 24 that can be sealed at 26 to preserve the tissue and help maintain its external shape. Further, various simulated maladies can be received by the carved uterine cavity within the tissue for modeling the ultrasonic responses of such maladies in a living patient's uterus as more fully described hereinbelow.

Similarly the ultrasonic response of the human vagina is advantageously simulated with a piece, of tissue 27 such as, for example, lean pork meat carved to simulate the size and configuration of vaginal walls and the vaginal cavity. The simulated vagina may similarly be enclosed in a preserving latex sac if desired to prolong the useful life of the tissue. Once modeled as described, the simulated uterus 20 and simulated vagina 27 are inserted into pelvic cavity 17 in their naturally occurring positions where they are generally embraced and cradled by the simulated urinary bladder 19 as described above to simulate the sonically reflecting interface encountered in a living patient. It has been found necessary in some instances to secure the uterus 20 in its proper position within the cavity with an appropriate adhesive to prevent its migration to inappropriate locations within the cavity during use.

The ultrasonic response of fallopian tubes has been found to be accurately simulated with latex rubber tubing 28 filled with a sonoresponsive substance such a vegetable oil and placed within the pelvic cavity in approximately the naturally occurring relative positions of actual fallopian tubes. The ultrasonic response f the ovarian structure itself can be simulated if desired with small latex rubber balloons filled with vegetable oil, silicone gel or other similar substance. One major objective of the illustrated preferred embodiment, however, is to simulate the ultrasonic responses of various maladies within the ovaries such as the various ovarian tumors that might be encountered in living patients. For this purpose, it has been found that simulating the structure of the ovaries themselves is not necessary. Accurate ultrasound images have been found to result by simply simulating the various maladies and placing the simulated maladies within the simulated pelvic cavity in the naturally occurring positions of the ovaries. In this regard, and with further reference to table 1, various maladies that might occur in a living patient will be described along with methods of simulating the ultrasonic response of such maladies within the pelvic cavity of the present invention.

One type of complex predominantly cystic mass encountered in the ovaries is the Dermoid cyst. This type of cyst falls into a class of ovarian tumors that generally includes those cystic masses having septa, internal contents or solid material. Another common member of this class is the ovarian epithelial tumor, specifically cyst adenoma. The sonographic appearance of tumors within this class and of the dermoid cyst in particular is highly specific. Typically, these tumors appear on a sonographic image as large cystic masses with internal septa, solid and irregular internal areas and cystic hair. As indicated in table 1, a latex sac filled with chicken fat, rubber bands, human hair and calcium crystals placed within the simulated pelvic cavity 17 has been found accurately to reproduce the ultrasonic response of a dermoid cyst within the ovary of a living patient when the model is ultrasonically examined. As previously mentioned, the simulated dermoid cyst is positioned within the pelvic cavity 17 in the normally occurring position of an ovary and the structure of the ovary itself is generally not modeled. In FIG. 1, various ovarian tumors and other abnormalities, including the dermoid cyst, are generally indicated at 29 and 30 to show the position of such with respect to other elements within the simulated pelvic cavity 17.

Another type of tumor encountered in the female pelvic cavity is the serous cyst adenoma. This type of tumor is typically characterized by the presence within the tumor of septations or dividing membranes. The ultrasonic response of such septated tumors has been found to be accurately simulated by a preferably elongated latex balloon filled with water and/or alcohol and folded over onto itself such that the balloon walls engage to simulate septations. The folded septated balloon is contained within an exterior latex sac to maintain the folded septation forming configuration of the balloon. Again, the simulated tumor is normally positioned within the simulated pelvic cavity in the normally occurring location of an ovary. It might, however, be positioned in another location within the simulated pelvic cavity 17 if desired to simulate such a tumor occurring on or in an organ other than the ovary.

The ultrasonic response of a simple symmetric cystic tumor has been found to be accurately modeled with a spherical latex balloon filled with a sonoresponsive oil such as vegetable oil.

Figure 2:
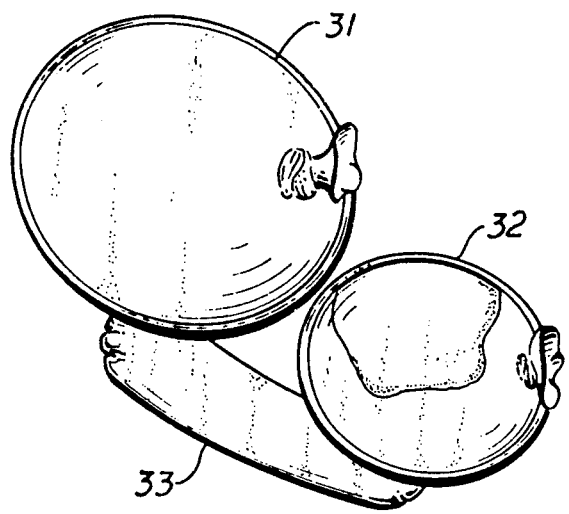
FIG. 2 illustrates a preferred method of simulating a fetus.

A condition known as an ectopic gestational sac or ectopic pregnancy results when a fertilized ovum implants in a location other than the uterus. Greater than 95% of such ectopic implantations occur within the fallopian tubes, particularly within the isthmic and ampullary portions. Ectopic pregnancy, if not treated, is almost always fatal. It is highly desirable, therefore, to diagnose and treat ectopic pregnancy at a very early stage and ultrasound has proven remarkably accurate in supporting such early diagnosis. In the present invention, the ultrasonic responses of symptoms of ectopic pregnancy have been found to be accurately simulatable. The ectopic or displaced gestational sac can be simulated by introducing an air pocket at an appropriate position within the pelvic cavity. A simulated fetus can also be implanted if desired. Such a simulated fetus (FIG. 2) can be modeled with a pair of small latex balloons 31 and 32 filled with water and oil respectively and interconnected with a fluid filled latex tube 33 simulating the fetal spine.

Figure 3:
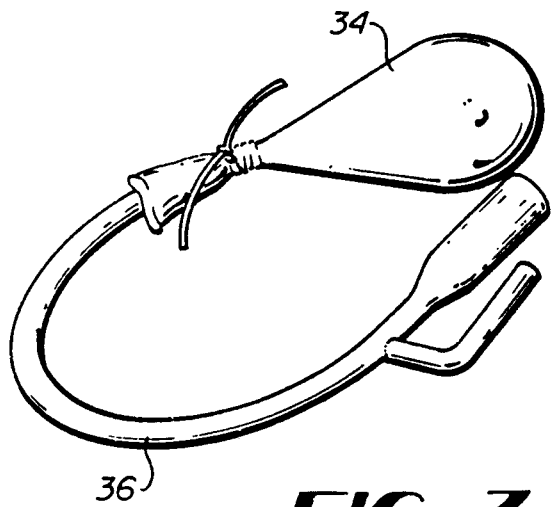
FIG. 3 illustrates a device for simulating the ultrasonic response of a foreign body such as an IUD in the uterus.
Figure 4:
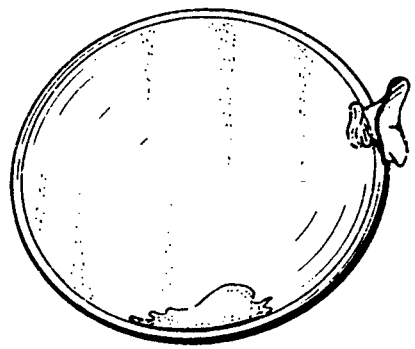
FIG. 4 illustrates a device for simulating the ultrasonic response of a simple tumor.

FIG. 3 illustrates a simulated intrauterine contraceptive device (IUD) that is sometimes encountered during ultrasound examination of the female pelvic cavity. The simulated IUD is seen to comprise a latex rubber bulb 34 that can be filled with a fluid such as silicone gel, glycerine, oil or water to simulate the ultrasonic response of an actual IUD. A tube 36 communicates with the interior of the bulb and can be used to inflate the bulb partially for dual simulation of an IUD and, for example, a gestational sac within the uterus. The simulated foreign body 40 in the uterus illustrated in FIG. 4 is implanted within the carved uterine cavity of the simulated uterus 20 (FIG. 1) to mimic the ultrasonic response of an actual foreign body such as an IUD therein. It should be noted that an actual IUD can be used in place of the simulated IUD of FIG. 3 if desired. The simulation, however, provides the ability to model both a foreign body within the uterus and an intrauterine sac with a single element.

FIG. 4 simply illustrates a symmetric latex balloon filled with sonoresponsive liquid and tied off to simulate, for example, a simple ovarian cyst 40 as discussed above.

With the simulated organs and desired simulated maladies implanted within the simulated pelvic cavity, the entire cavity is filled with a substantially sonolucent fluid that surrounds and suspends the elements within the cavity and simulates the ultrasonic response characteristics of internal body fluid. It has been found that glycerine serves this purpose well in the preferred embodiment. When thus filled, the cavity can be covered with the rubber flap 18 (FIG. 1) that simulates the abdomen of a living patient. A trainee can then examine the model as he would a patient using ultrasound imaging equipment. The model and its internal contents, in return, respond to the trainees ultrasound examination to generate ultrasound images that correspond closely to those produced by a living patient with organs and abnormalities corresponding to those simulated as described and implanted in the model. The trainee can thus gain valuable experience in the application of ultrasound techniques and, more importantly, the critical analysis of ultrasound images produced by internal maladies such as tumors, cysts and ectopic pregnancies. The various simulated maladies can be intermixed and/or interchanged at will to provide a vast range of ultrasound experience in a very short time relative to experience with live patients.

The invention has been described in terms of a specific preferred embodiment for use in obstetric and gynecological ultrasound training. It will be obvious to those of skill in the art, however, that the invention embodied therein has application to many other medical specialties. The upper abdomen or the chest cavity could easily be modeled in analogous ways for training in the application of ultrasound to the anatomies of these areas of the body. Further, while specific illustrative examples of simulated organs and maladies have been presented, many other materials and combinations might be employed in the simulation with equally acceptable results, it being important only that the selected materials mimic the ultrasonic responses of the organs and maladies being simulated. Finally, the specific simulations presented herein were designed for use with a 5.00 megahertz sector transducer ultrasound imaging apparatus. Materials other than those presented might well be required to simulate the desired ultrasonic responses at different frequencies. Many other additions, deletions and modifications might therefore be made to the preferred embodiment without departure from the spirit and scope of the invention as set forth in the claims.

TABLE 1

| ORGAN OR MALADY | PREFERRED SIMULATION |
|---|---|
| BLADDER | PREVIOUSLY OVERSTRETCHED LATEX BALLOON PARTIALLY FILLED WITH WATER. |
| UTERUS | PORK MEAT CARVED TO FORM AN INTERNAL CAVITY AND TO APPROXIMATE THE SHAPE OF A HUMAN UTERUS. THE CARVED PORK MEAT IS PLACED INSIDE A LATEX BALLOON. |
| VAGINA | PORK MEAT CARVED WITH AN INTERNAL CAVITY TO APPROXIMATE SIZE AND SHAPE OF HUMAN VAGINA. |
| FALLOPIAN TUBES | LATEX TUBING FILLED WITH OIL. |
| DERMOID CYST | LATEX BALLOON FILLED WITH CHICKEN FAT, RUBBER BANDS, HUMAN HAIR AND CALCIUM CRYSTALS. |
| SEROUS CYST ADENOMA | LATEX SACK FILED WITH WATER AND ALCOHOL WITH THE SACK DOUBLED ONTO ITSELF TO FORM A SEPTATION AND INSERTED INTO AN EXTERNAL LATEX SACK. |
| FOREIGN BODY IN UTERUS (IUD) | LATEX BULB FILLED WITH FLUID AND BEING AT LEAST PARTIALLY INFLATABLE WITH AIR. THE BULB AND ITS INFLATION TUBE ARE POSITIONED IN THE SIMULATED UTERINE CAVITY. |
| SIMPLE CYST | LATEX BALLOON FILLED WITH OIL. |
| ECTOPIC GESTATIONAL SAC | SIMULATED BY INTRODUCING AN AIR POCKET INTO THE UTERINE MODEL. FETUS MODELED WITH A PAIR OF LATEX SACKS FILLED WITH OIL AND WATER RESPECTIVELY WITH A LATEX TUBE EXTENDING BETWEEN THE SACKS ON ONE SIDE THEREOF TO SIMULATE FETAL SPINE. |
| FEMALE PELVIC BONE STRUCTURE | PELVIC PORTION OF ACTUAL OR SYNTHETIC FEMALE SKELETON. |
| PELVIC CAVITY | SIMULATED LINING PELVIC BONE STRUCTURE WITH LATEX SHEETING. |
| INTERNAL BODY FLUIDS | SIMULATED WITH GLYCERINE WHICH FILLS THE PELVIC CAVITY AND IN WHICH THE SIMULATED ORGANS AND MALADIES ARE SUSPENDED. |
| ABDOMEN | LATEX SHEET OVERLYING PREPARED PELVIC CAVITY. |
| CONTAINER | PLEXIGLASS CONTAINER WITH FOAM BLOCK THAT SUPPORTS THE PELVIC MODEL IN A NORMAL LYING DOWN ORIENTATION FOR APPLICATION OF ULTRASOUND TECHNIQUES. |

I claim:

1. For use in ultrasonography training, an apparatus for simulating the ultrasonic responses of the human anatomy during ultrasound examination with said apparatus comprising:

a first member configured to simulate the human female pelvic cavity;

one or more second members configured to be contained in said first member and including a simulated urinary bladder;

said one or more second members being adapted to simulate the ultrasonic response of internal human anatomy during ultrasound examination; and fluid means surrounding said one or more second members within said first member for simulating the ultrasonic response of internal body fluid during ultrasound examination.

2. For use in ultrasonography training, an apparatus for simulating the ultrasonic response of the human anatomy during ultrasound examination with said apparatus comprising:

a first member configured to simulate the human female pelvic cavity;

one or more second members configured to be contained in said first member;

said one or more second members being adapted to simulate the ultrasonic response of internal human anatomy during ultrasound examination; and fluid means surrounding said one or more second members within said first member for simulating the ultrasonic response of an internal body fluid during ultrasound examination, wherein said first member includes a female pelvic skeleton and an interior lining within said pelvic skeleton, said interior lining being substantially imperious to said fluid means.

3. An ultrasonography training apparatus as claimed in claim 2 wherein said interior lining comprises a latex rubber sheet conformed to the interior contours of said female pelvic skeleton.

4. An ultrasonography training apparatus as claimed in claim 2 wherein said one or more second members includes a simulated urinary bladder.

5. An ultrasonography training apparatus as claimed in claim 4 wherein said simulated urinary bladder comprises a latex rubber balloon at least partially filled with a liquid that simulates the ultrasonic response of urine during ultrasound examination.

6. An ultrasonography training apparatus as claimed in claim 5 wherein said liquid comprises water.

7. An ultrasonography training apparatus as claimed in claim 6 wherein said latex rubber balloon has been pre stretched beyond its elastic limit.

8. An ultrasonography training apparatus as claimed in claim 2 wherein said one or more second members includes a member adapted to simulate the ultrasonic response of a female human uterus during ultrasound examination.

9. An ultrasonography training apparatus as claimed in claim 8 wherein said member adapted to simulate the ultrasonic response of a female human uterus during ultrasound examination comprises a latex rubber sac and means within said latex rubber sac for simulating the ultrasonic response of uterine walls and the uterine cavity during ultrasound examination.

10. An ultrasonography training apparatus as claimed in claim 9 wherein said means for simulating the ultrasonic response of uterine walls and the uterine cavity comprises animal tissue carved to simulate the shape and size of uterine walls and the uterine cavity.

11. An ultrasonography training apparatus as claimed in claim 1 wherein said one or more second members includes at least one member adapted to simulate the ultrasonic response of an anatomical malady during ultrasound examination.

12. An ultrasonography training apparatus as claimed in claim 4 wherein said malady is an ovarian dermoid cyst.

13. An ultrasonography training apparatus as claimed in claim 12 wherein said member adapted to simulate the ultrasonic response of said ovarian dermoid cyst comprises a latex rubber sac containing at least chicken fat, human hair, rubber bands and calcium crystals.

14. An ultrasonography training apparatus as claimed in claim 11 wherein said malady is a foreign body in the uterus.

15. An ultrasonography training apparatus as claimed in claim 1 wherein said fluid means comprises liquid glycerin.

16. An ultrasonography training apparatus as claimed in claim 1 and further comprising a container adapted to receive said apparatus with said container including a lid positioned to be closed over said apparatus, said lid being transparent to ultrasonic waves of the type issued by ultrasound examination equipment.

* * * * *